United States Patent [19]

Horie et al.

[11] 4,307,199

[45] Dec. 22, 1981

[54] PROCESS FOR MAKING HEAT INSULATING FIREBRICKS

[75] Inventors: Eiji Horie, Aichi; Takeo Saeki, Toyokawa; Shinichiro Oosawa, Toyokawa; Hideo Hisaka, Toyokawa; Naoki Tanetani, Toyokawa, all of Japan

[73] Assignee: Isolite Insulating Products Co., Ltd., Osaka, Japan

[21] Appl. No.: 122,806

[22] Filed: Feb. 19, 1980

[30] Foreign Application Priority Data

Feb. 20, 1979 [JP] Japan ................................ 54-18898

[51] Int. Cl.$^3$ ............................................ C04B 35/02
[52] U.S. Cl. .................................... 501/124; 106/104
[58] Field of Search ......................... 106/41, 64, 104; 260/29.6 S

[56] References Cited

U.S. PATENT DOCUMENTS

| | | | |
|---|---|---|---|
| 3,711,431 | 1/1973 | Vargiu et al. | 260/29.6 S |
| 3,733,285 | 5/1973 | Steffy | 260/29.6 S |
| 3,883,359 | 5/1975 | Harvey | 106/104 |

*Primary Examiner*—James Poer
*Attorney, Agent, or Firm*—Watson, Cole, Grindle & Watson

[57] ABSTRACT

A process for manufacturing heat-insulating firebricks wherein an alumina cement, a water-soluble styrene maleic resin and water are added to a mixture containing a refractory aggregate, an inorganic binder and a granular foamed polystyrene, the resultant mixture being then kneaded and cast in a mold. The added amounts of alumina cement and water-soluble styrene maleic resin are small and water is added to an extent of not more than 50% by weight. The alumina content in the alumina cement is between 8 and 75% by weight.

4 Claims, No Drawings

PROCESS FOR MAKING HEAT INSULATING FIREBRICKS

BACKGROUND OF THE INVENTION

1. Field of the Invention

This invention relates to a process for making heat insulating firebricks especially heat-insulating firebricks which are comparatively light in weight.

2. Description of the Prior Art

Heat-insulating firebricks are conventionally formed by a manufacturing method which includes forming a first mixture of a refractory clay and a highly refractory aggregate (e.g. alumina, alumina silica, silicic acid, magnesia or zirconia); adding a granular, combustible pore-forming agent (e.g. wood chips, foamed polystyrene or coke) to the first mixture to form a second mixture; adding water to the second mixture to provide a moldable mixture; kneading (mixing) the moldable mixture; forming the moldable mixture into a shaped product by extruding, pressing or casting; drying and firing the shaped product; and, if necessary, finishing the fired product.

In some manufacturing methods the pores in the firebricks are formed by the addition of naphthalene, by the addition of substances which will chemically react to form bubbles, by the direct addition (physical addition) of bubbles, or else the weight of the firebricks is controlled by the addition of a light refractory aggregate or natural diatomaceous earth. However, these manufacturing methods have disadvantages as well as advantages.

Heat-insulating firebricks must display a low thermal conductivity and have a low bulk specific gravity (with a given shape, a given pore size and distribution, a given sintering degree and a given chemical composition, the lower the bulk specific gravity the lower the thermal conductivity), they must have a high strength for their bulk specific gravity and they must be capable of withstanding the high temperatures of the environments in which they are to be used. In addition, they must display low shrinkage and low deformations during their manufacture, and the materials from which they are made must be easily shaped. Also, the combustibles, when used as the pore-forming agents, must be smoothly burning. And of course the manufacturing method must be highly productive.

However, since many of the foregoing requirements are contradictory, no completely satisfactory method for manufacturing firebricks has yet been devised.

In Japanese Patent Publication No. 15232/35, published Oct. 13, 1960, a firebrick-forming method is discussed wherein light-weight, heat-insulating firebricks having good properties are cast in molds, the moldable mixture including foamed polystyrene as the pore-forming agent. The foamed polystyrene will not absorb much water and thus reduced amounts of water will be required for the casting step, and because the foamed polystyrene is spherical, the firebrick products will be uniform in composition, low in shrinkage when fired and reheated and high in strength for their bulk specific gravity. Also foamed polystyrene, being low in calorific content, will burn in an easily controlled manner.

However, although foamed polystyrene absorbs only small amounts of water during casting, nevertheless these absorbed amounts are higher than in some other molding methods and the products formed will likely display a great shrinkage when dried. Unless gypsum molds are used (these molds absorbing water), the shaped products cannot be removed from the molds until dried. Thus the casting technique in this Japanese Patent Publication using foamed polystyrene is less efficient than when using press-molding or extrusion-molding. Also, when dehydrated, the foamed polystyrene will likely become trapezoidal, thus producing a firebrick product which will be unstable in shape. And even though the slip in the mold could be stabilized with gypsum, cement, size or resin, such a large amount of these stabilizing materials would need to be used that the chemical composition of the firebricks would vary greatly, thus interfering with the drying and firing steps and resulting in a long and incomplete hardening of the slip.

It is thus an object of the present invention to provide an improved process for manufacturing heat-insulating firebricks using a method wherein the mixture forming the firebricks is cast in a mold, the mixture including added agents for quickly setting the firebrick-forming slip in the mold, these agents otherwise having substantially no influence on the chemical composition of the firebricks.

SUMMARY OF THE INVENTION

According to the present invention, improved light-weight, heat-insulating firebricks can be produced by first preparing a mixture of a refractory aggregate, an inorganic binder and a granular foamed polystyrene; then adding to the mixture a small amount of an alumina cement (alumina content of 8 to 75% by weight), a small amount of a water-soluble styrene maleic resin and not more than 50% by weight of water to the mixture to form a resultant mixture; then kneading the resultant mixture; and finally casting the kneaded resultant mixture in a mold to thus form the heat-insulating firebricks. The alumina cement and the water-soluble styrene maleic resin will react to set the slip in the mold, yet have a minimal influence on the chemical composition of the produced firebricks.

DETAILED DESCRIPTION OF THE INVENTION 50 to 10 parts by weight of a fine powder (e.g. 100 mesh) of a refractory clay binder or the below-mentioned refractory aggregate are added to 50 to 90 parts by weight of powdery granules (about 28 mesh) of a refractory aggregate or light aggregate such as alumina, alumina silica, silicic acid, magnesia or zirconia, then an alumina cement (which is to be hardened by reacting with a water-soluble styrene maleic resin) is added to the mixture; and the resultant dry mixture is then mixed thoroughly. The alumina cement which is used is a high alumina cement, an alumina cement or a jet cement having an alumina content of 8 to 75% by weight. The type and amount will be determined by the desired influence on the chemical composition of the final heat-insulating firebricks, the time required for the hardening and the amount of water-soluble styrene maleic resin which is added later. In this regard, when producing heat-insulating firebricks of an alumina silica type, an alumina cement or a high alumina cement is used in an amount between about 3 to 1 part by weight per 100 parts by weight of the total of the refractory aggregate and binder, i.e., in order to make the amount of CaO also added to mixture as small as possible. When producing heat-insulating firebricks of an alumina-silicacalcia type by using an alumina silica type raw material, the amount of added CaO is not so limited, but if the amount of the alumina cement is too high, the hardening time will become too short. Therefore about 15% by weight of CaO is a limit. However, if the CaO source is obtained otherwise and the hardening time is only proper, 1 to 3% by weight will do. In case an alumina cement having CaO to the extent of 40% by weight is used, the amount of CaO added to the heat-insulating firebricks will be 0.4 to 1.2% by weight and its influence on the quality of the heat-insulating firebricks will be very little. In case $Al_2O_3$ is not desired in the mixture, it is necessary to use a jet cement containing very little $Al_2O_3$. The chemical compositions of alumina cements are shown in Table 1.

TABLE 1

|  | $Al_2O_3$ | $SiO_2$ | $Fe_2O_3$ | CaO | MgO |
|---|---|---|---|---|---|
| Alumina cement | 56 | 4.0 | 0.9 | 36 | 0.5 |
| High alumina cement | 73 | 0.2 | 0.2 | 26 | 0.1 |
| Jet cement | 11 | 14 | 1.7 | 65 | 1.3 |

Next, a granular foamed polystyrene as a pore-making agent is added so that a predetermined bulk specific gravity may be obtained. A portion, a part of the foamed polystyrene may be replaced with bubbles or wood chips. However, if the amount of water to be added exceeds 90 to 100 parts by weight (45 to 50% by weight in all) per 100 parts by weight of all the mixture, the effect of accelerating the hardening by adding the alumina cement and water-soluble styrene maleic resin will not be substantially obtained.

Next, a water-soluble styrene maleic resin is added to the mixture of all the aggregate, binder, alumina cement and foamed polystyrene solids.

This resin, which is added as a solute in an aqueous solution, is used in an amount of 0.1 to 0.3 part by weight per 100 parts by weight of the total of the aggregate and binder. The resin-containing solution is added to the above-mentioned mixture of the aggregate, inorganic binder, alumina cement and foamed styrene and the mixture is quickly kneaded. The kneaded mixture is then cast into a prepared mold. This casting will harden in several minutes so as to be removable from the mold. When the amount of addition of the resin is not more than the above-mentioned 0.1 part by weight, the effect will be low. When it is not less than 0.1 part by weight, the hardening time will be long in proportion to the amount of addition of the resin. When it is 0.3 part by weight, the hardening time will be substantially constant. The hardening time can be variously adjusted by varying the amounts of added alumina cement and resin, and further by the addition of a hardening retarder or accelerator.

The thus-obtained hardened body can be removed from the mold in a short time, therefore the frequency of using the mold can be increased, the firebricks can be very efficiently produced and will display low shrinkage and deformation when dried (as compared to any other method) and even if the firebrick is not dried at all or is dried, it can be fired with slight drying. Further, together with the effect of the foamed polystyrene, there can be obtained a heat-insulating firebrick which is low in shrinkage and deformation when fired, is comparatively easy to control in firing and is high in strength for its bulk specific gravity.

An example of the present invention shall be shown in the following as compared with conventional examples.

A heat-insulating firebrick was made in the above mentioned manner by using a raw material mixture shown in Table 2 and a wood mold under manufacturing conditions shown in Table 3. The properties of the obtained heat insulating firebrick are shown in Table 4.

TABLE 2

| Mixture | Example of present invention | Conventional example (1) | Conventional example (2) |
|---|---|---|---|
| Refractory chamotte (SK#32 to 34, 37% $Al_2O_3$ and 57% $SiO_2$ of a granularity of 28 meshes). | 75 kg | 75 kg | 50 kg |
| Refractory clay (SK#32) | 25 kg | 25 kg | 50 kg |
| Alumina cement (of 56% $Al_2O_3$ and 36% CaO) | 3 kg | — | — |
| Foamed polystyrene (of a granule diameter of 2 mm. and average bulk specific gravity of 0.015). | 250 l (3.7 kg) | 243 l (3.6 kg) | — |
| Wood chips (of not more than 2.4 mm. and a bulk specific gravity of 0.20). | — | — | 400 (80 kg) |
| Water-soluble styrene maleic resin. | 0.3 kg | — | — |
| Water | 46 l (30% by weight) | 55 l (35% by weight) | 130 l (42% by weight) |

TABLE 3

| Manufacturing conditions | Example present invention | Conventional example (1) | Conventional example (2) |
|---|---|---|---|
| Molding method | Casting | Casting | Vibration casting |
| Time (ratio) until the removal from the mold. | 6 minutes (1) | 16 hours (160) | 16 hours (160) |
| Drying time (ratio) | 16 hours (1) | 16 hours (1) | 48 hours (3) |
| Shrinkage (ratio) when dried | 0.5% (1) | 0.8% (1.6) | 3% (6) |
| Firing time (ratio). | 6 hours (1) | 6 hours (1) | 18 hours (3) |
| Shrinkage (ratio) when fired. | 6% (1) | 9% (1.5) | 12% (2) |
| Working | Required in some cases | Required | Required |

TABLE 4

| Properties | Example of the present invention | Conventional example (1) | Conventional example (2) |
|---|---|---|---|
| Bulk specific gravity | 0.46 | 0.48 | 0.55 |
| Compressive strength in kg/cm$^2$ | 15 | 17 | 9 |
| Shrinkage in % when reheated | 0.41 | 0.39 | 0.82 |
| Chemical composition CaO in % | 1.3 | 0.3 | 0.3 |

The water-soluble styrene maleic resin used was Sumirez Resin 402 (trade name) produced by Sumitomo Chemical Co., Ltd.

Also, the variations in the hardening time when only the added amount of alumina cement was varied under the same conditions as in this example are shown in Table 5 and the variations in the hardening time when only the added amount of resin was varied are shown in Table 6.

TABLE 5

| Amount of alumina cement | 2% | 3% | 4% | 5% |
|---|---|---|---|---|
| Hardening time | 8 minutes | 6 minutes | 4 minutes | 3 minutes |

TABLE 6

| Amount of addition of resin | 0.1% | 0.2% | 0.3% | 0.4% | 0.5% |
|---|---|---|---|---|---|
| Hardening time | 2 minutes | 4 minutes | 6 minutes | 6.3 minutes | 6.3 minutes |

While the present invention has been described with reference to particular examples thereof, it will be understood that numerous modifications may be made by those skilled in the art without actually departing from the spirit and scope of the invention as defined in the appended claims.

We claim:

1. A process for making heat-insulating firebricks which display low shrinkage and low deformations when fired, yet high strengths, said method comprising
    (a) mixing together 50–90 parts by weight of a refractory aggregate and 50–10 parts by weight of a refractory clay so as to form a first mixture,
    (b) adding granular foamed polystyrene to said first mixture in an amount sufficient to provide pores in the heat-insulating firebricks, thereby preparing a second mixture,
    (c) adding 1 to 3 parts by weight, based on 100 parts by weight of combined refractory aggregate and refractory clay, of an alumina cement to said second mixture, said alumina cement having an alumina content of 8 to 75% by weight, thereby preparing a third mixture,
    (d) adding to said third mixture an aqueous solution of a water-soluble styrene maleic resin to form a fourth mixture, the amount of water-soluble styrene maleic resin added to said third mixture being between 0.1 and 0.3 parts by weight, based on 100 parts by weight of combined refractory aggregate and refractory clay, and the amount of water added to said third mixture being no more than 50% by weight, based on the weight of the combined refractory aggregate, refractory clay and granular foamed polystyrene,
    (e) kneading said fourth mixture,
    (f) casting said kneaded fourth mixture in a mold to form the heat-insulating firebricks, and
    (g) drying and firing said cast heat-insulating firebricks.

2. The process as defined in claim 1, wherein said refractory aggregate is selected from the group consisting of alumina, alumina silica, silicic acid, magnesia and zirconia.

3. The process as defined in claim 2, wherein said refractory aggregate is an alumina silica containing 37% alumina and 57% silica.

4. The process as defined in claim 1, wherein said kneaded fourth mixture is cast in the molds in step (f) for no more than 6 minutes.

* * * * *